United States Patent [19]

Genesio et al.

[11] Patent Number: 4,624,637

[45] Date of Patent: Nov. 25, 1986

[54] ROLLING PIPE CENTERING APPARATUS

[75] Inventors: Rene Genesio; Jean P. Martinez; Romain Schmitt, all of Pont-A-Mousson, France

[73] Assignee: Pont-A-Mousson S.A., Nancy, France

[21] Appl. No.: 773,727

[22] Filed: Sep. 9, 1985

[30] Foreign Application Priority Data

Sep. 10, 1984 [FR] France ................................ 84 13860

[51] Int. Cl.⁴ .......................... F27D 3/00; F27B 9/14; B65G 47/26
[52] U.S. Cl. .................................... 432/239; 198/456; 432/123; 432/124
[58] Field of Search ..................... 432/123, 124, 239; 198/456

[56] References Cited

U.S. PATENT DOCUMENTS 1,551,827  9/1925  Ladd ................................... 432/124
2,087,731  7/1937  Klouman ............................ 432/124
3,470,997 10/1969  Trounce ............................. 198/456

FOREIGN PATENT DOCUMENTS 423715  9/1974  U.S.S.R. ............................. 198/456

Primary Examiner—John J. Camby
Attorney, Agent, or Firm—Sughrue, Mion, Zinn, Macpeak and Seas

[57] ABSTRACT

When pipes 8 are rollingly conveyed through a furnace along parallel rails 7, any lateral migrations of the pipes are periodically corrected by movable stops 18 which are extended inwardly in unison to abut the pipe ends and re-center them. The stops are mounted on elbowed arms 14 articulated about axes 15 disposed beneath the furnace bed together with fluid control cylinders 16 for the arms, thus providing unobstructed access around the side walls 2 of the furnace. The pipes roll over elevated slide runners 11 during their lateral re-centering by the stops, thereby avoiding the wear and abrasion of the rail crowns.

9 Claims, 3 Drawing Figures

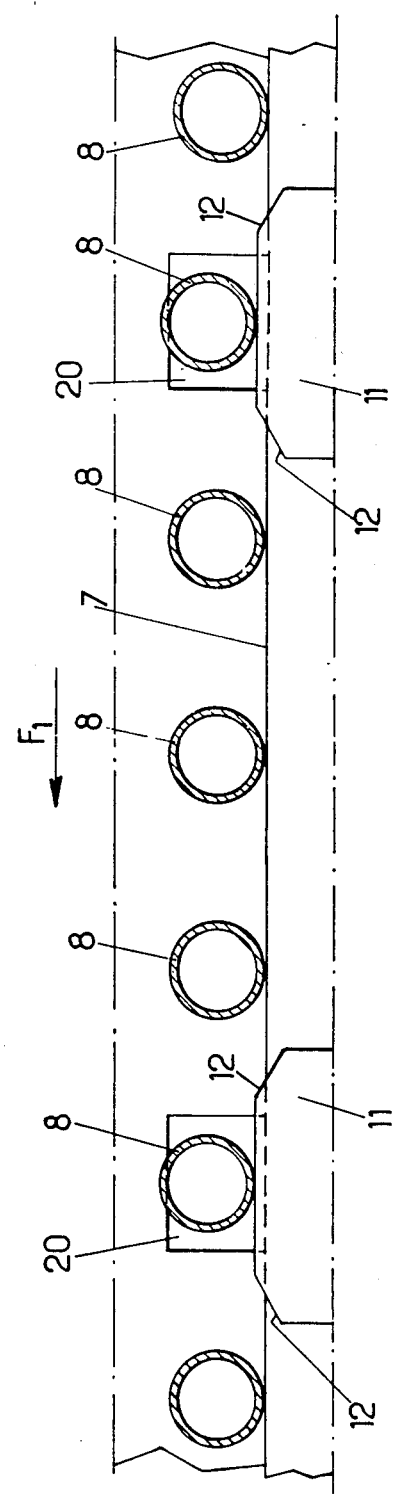

ROLLING PIPE CENTERING APPARATUS

BACKGROUND OF THE INVENTION

This invention relates to an apparatus for transversely centering long cylindrical objects such as cast iron pipes as they are rolled through a furnace in a direction perpendicular to their axes in order to heat them or to impart some other form of heat treatment.

Besides the usual heating means, a furnace of this type includes a bed provided with tracks or rails, generally parallel to each other and to the longitudinal axis of the furnace, over which the pipes are rolled by a conveyor from the upstream furnace entrance to the downstream furnace exit.

The pipes may be drawn downstream through the furnace by toothed chains parallel to the rails, with the teeth protruding above the rolling surface of the rails so as to tangentially contact the outer surface of the pipes (similar to a car wash conveyor). Two parallel chains may be provided, with one located under each end of the pipes. In the longitudinal plane of the furnace, the space between adjacent te is set to accommodate a large range of pipe diameters. In the transverse plane, the chain teeth are aligned perpendicular to the path traveled by the pipes.

The movement of the chains, which are drawn by known means, is synchronized so that the pipes will roll transversely over the rails, with their axes orthogonal to the longitudinal axis of the furnace.

Any unwanted axial slippage of the pipes toward one of the lateral walls of the furnace is periodically corrected by movable centering stops placed on either side of the walls. The movement of these stops is synchronized, and they exert force upon the ends of the pipes along their longitudinal axes.

The movable stops are activated by control means such as linear actuators mounted outside the furnace perpendicular to its lateral walls. Thus arranged, the stops maintain the pipes in the center of the furnace and thus prevent friction and any unwanted catching of the ends of the pipes on the inner walls of the furnace.

Positioning means such as these have the disadvantage, however, of being bulky and of blocking access to the furnace. Furthermore, the longitudinal sliding needed to reposition the pipes, as described above, affects the alignment of the movable stops by wearing away the crown of the rails by abrasion, which necessitates their regular and frequent replacement with all of the material and financial drawbacks that this entails.

SUMMARY OF THE INVENTION

In view of the above disadvantages, an object of the invention is first, outside the lateral walls of the furnace, to solve the problem of lessening the interference of the stops and their control means with the furnace's access ways, and, second, to eliminate transverse wear on the rails during the repositioning of the pipes, thus reducing the costs inherent in the regular replacement of the worn rails. The latter is a relatively costly operation due to the cost of the raw material of which they are made (heat resistant steel), the labor involved, and the downtime of the furnace.

According to one aspect of the invention, the apparatus comprises two or more parallel tracks or rails over which long cylindrical objects (pipes) are rolled by conveyors, and one or more positioning devices each comprising two movable centering stops disposed facing each other on opposite sides of the two rails. Under the control of fluid cylinders, the stops may occupy either an active position in which they move towards each other to engage the two ends of a pipe rolling along between them to transversely center the pipe, or a retracted position in which the two stops are withdrawn from their active position. The two stops are carried by symmetrically elbowed arms complementarily disposed, each articulated about an axis parallel to the direction in which the pipes are rolling and disposed below the plane of the two rolling rails. The control cylinders that actuate the arms are also disposed below the plane of the rails, thereby enabling unobstructed access to the furnace at the level of the rolling pipes.

Each arm may carry a counterweight to automatically return it to a retracted position in the event of a power failure or the loss of fluid pressure.

According to another aspect of the invention, which is independent of the preceding one but which can advantageously be used in combination with it, in the vicinity of the two rolling rails and at the level of each pair of movable stops, there are two or more ramped slide runners, elevated with respect to the plane of the rails, over which the pipes roll when they pass between the stops.

With this arrangement the transverse centering movements of the pipes are made on the easily replaceable runners, thereby avoiding the wear and abrasion of the rail crowns.

BRIEF DESCRIPTION OF THE DRAWINGS

FIG. 3 is a partial cross-section along line III—III of FIG. 2.

DETAILED DESCRIPTION OF THE PREFERRED EMBODIMENTS

Figure 1:
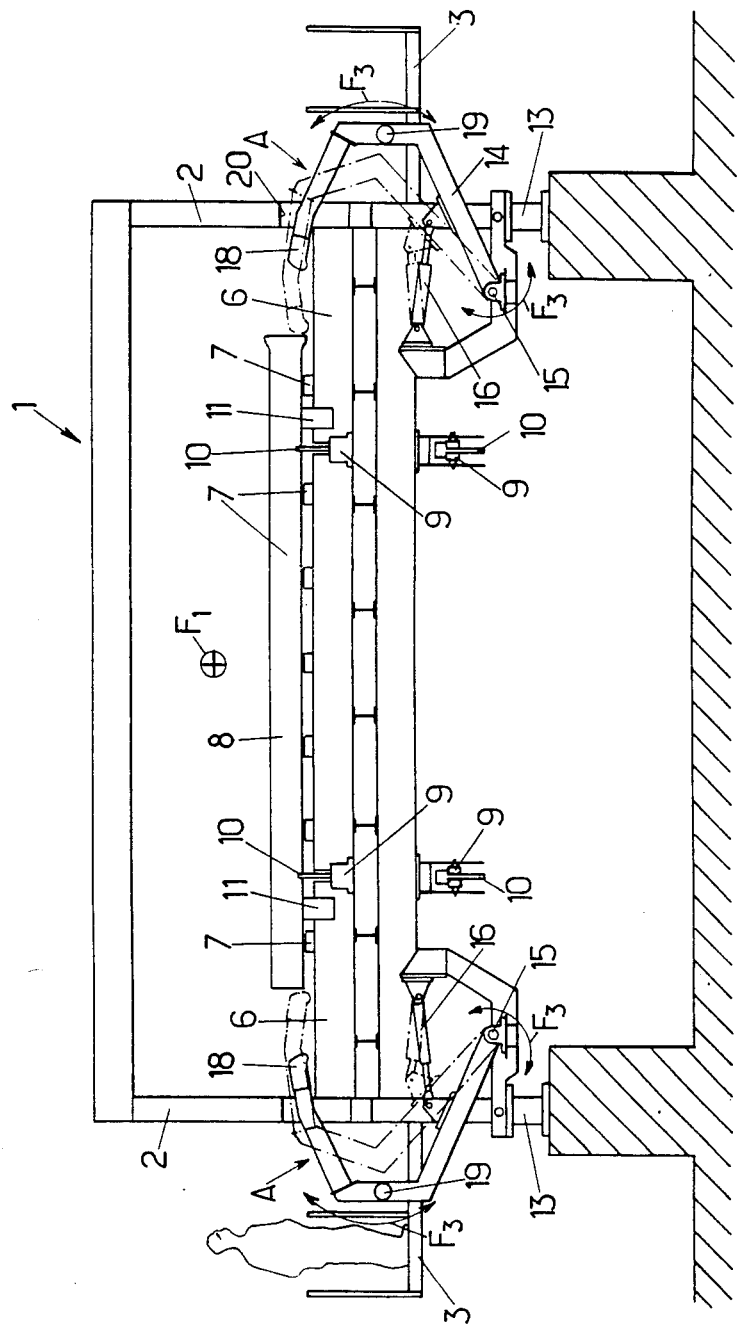
FIG. 1 is a transverse cross-section of an apparatus in accordance with a preferred embodiment of the invention.
Figure 2:
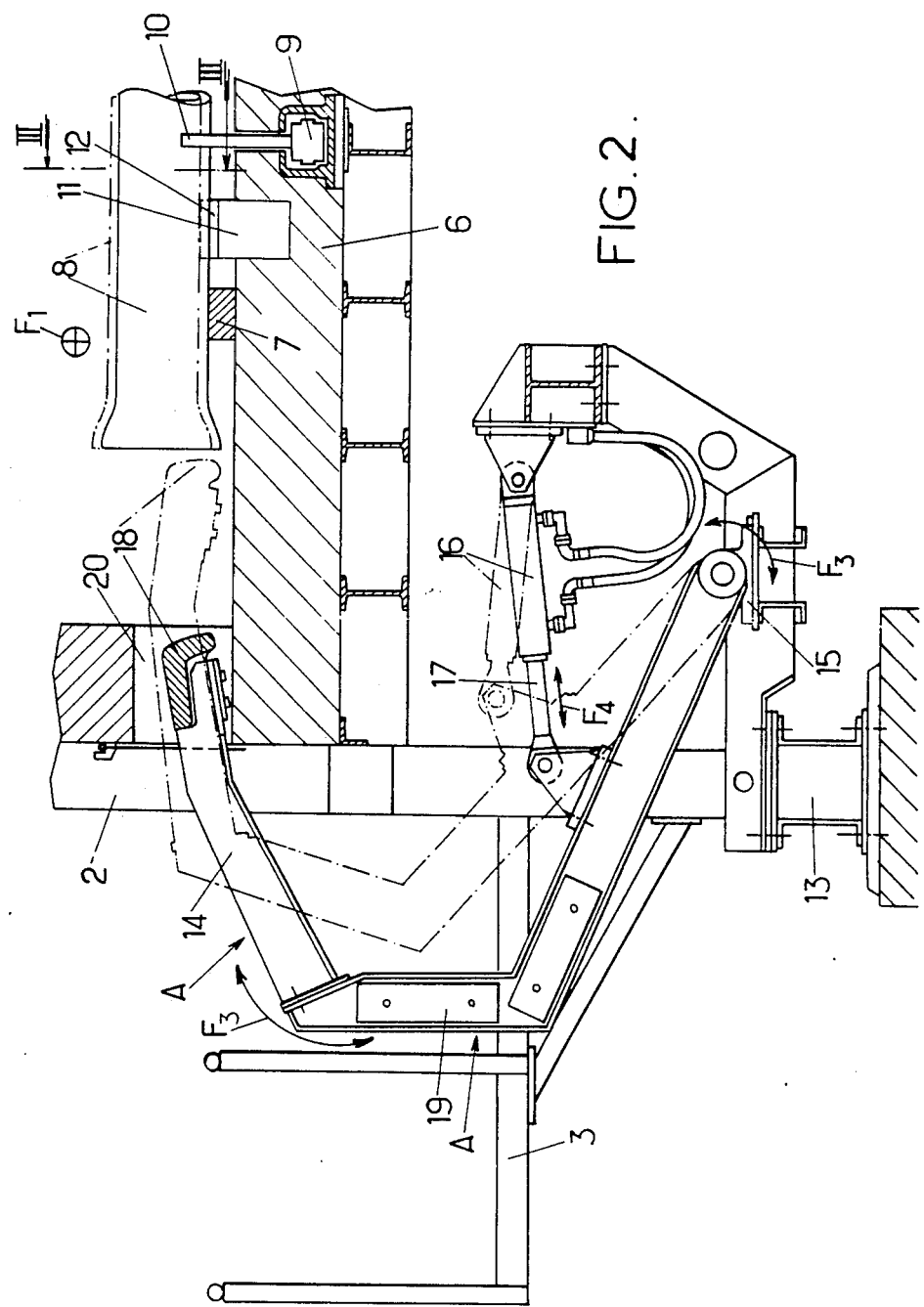
FIG. 2 is an enlarged transverse cross-section of the apparatus showing particular details of the invention.

FIGS. 1 and 2 show cross-sections of a heat treatment furnace 1 in which long cylindrical objects, which may be iron pipes 8, are rolled in the direction of arrow F1 perpendicular to their axes. The pipes may undergo heat treatment, such as reheating, whereby the furnace comprises handling means to move and position the pipes. The furnace also includes heating means, not shown, and a bed 6 equipped with rolling tracks or rails 7 which are parallel to each other and to the longitudinal axis of the furnace. The pipes 8 are rolled through the furnace over the rails by conveyor chains 9 parallel to the rails 7 and provided with teeth 10. The teeth protrude above the rolling plane of the rails and thus tangentially contact the outer walls of the pipes 8. A furnace of this type may comprise two parallel chains 9, with one disposed below each of the two ends of pipes 8.

In the longitudinal plane of the furnace 1, the space between adjacent teeth 10 is set to accommodate pipes of a wide range of diameters. In the transverse plane of the furnace, the cooperating or opposite teeth on the respective chains are disposed on lines perpendicular to the direction in which the pipes 8 are rolled. The movement of each of the chains 9, which are driven by means not shown, is synchronized so that the pipes 8 will roll transversely over the rails 7 with their axes of rotation orthogonal to the longitudinal axis of the furnace.

To periodically correct any transverse slippage of the pipes toward either of the lateral furnace walls 2, a plurality of positioning means A are provided, regularly spaced along the furnace 1. Each comprises two movable stops 18 disposed facing each other on opposite sides of the rails 7. Under the control of fluid cylinders 16, the stops 18 may occupy either an extended active position in which they engage or abut against the two ends of a pipe 8 moving along between them to reposition the pipe transversely, or a retracted position in which the two stops 18 are withdrawn from the pipe movement path.

The stops 18 are carried by two symmetrically elbowed arms 14 articulated about axes 15 parallel to the direction F1 in which pipes 8 are rolling and disposed beneath the plane of the rails 7, with the cylinders 16 that control each of the arms also being disposed beneath the plane of the rails. The circular or arcuate motion of the arms 14 occurs in the direction of arrows F3.

Counterweights 19 may be provided, mounted on arms 14 eccentrically with respect to axes 15, to return each arm to a retracted position of its stop 18 in case of a power failure to the control cylinders 16.

The control cylinders may consist of double-acting hydraulic jacks set between stationary supports 13 and arms 14. The rods 17 of the jacks move in the direction of arrow F4.

Counterweights 19 also come into play when the two chambers of the jacks are placed in communication with each other and simultaneously with discharge circuits leading to a supply tank or sump through means (not shown) for detecting pressure or the shut-down of the hydraulic pressure source.

In the vicinity of the rails 7 and at the level of each pair of movable stops 18, slide runners 11 elevated with respect to the plane of the two rails are provided. The pipes 8 are positioned over these runners when they pass between the stops 18, as the stops are extended to interact with the opposite pipe ends to center each pipe transversely. During the centering movement the stops are extended towards each other in unison. One of them will first abut against an end of a laterally migrated pipe and push it towards a centered position; the other stop thus serves primarily as an abutment to prevent any overcentering movement.

As shown in FIG. 3, in which the same reference numerals refer to the same elements as in FIG. 2, each slide runner 11 comprises front and rear access ramps 12 to facilitate the ascent and descent of the pipes 8 onto and off of the slide runner.

FIG. 3 clearly shows that a pipe 8 traveling over rails 7 climbs the front ramps 12 of the slide runners 11, is transversely repositioned, and exits the slide runners by the rear ramps 12 to rejoin the rails 7.

The handling apparatus of the invention offers a number of advantages, among which are those summarized below:

(a) Access points around the furnace 1 are freed, particularly at the levels of the lateral walls 2, at movable stop ports 20 provided in such walls, and at the walkway 3 provided around the furnace. This is achieved by the geometry of the symmetrically elbowed arms that support the stops, and the mounting of the arms and control cylinders 16 below the furnace bed 6.

(b) In the event of an accidental power failure affecting the control cylinders, the arms 14 and the stops 18 are automatically retracted by the counterweights 19 to avoid any unwanted interference with the rolling pipes if the failure occurs when the stops are in an active position.

(c) Transverse wear to the crown of the rails is avoided through the substitution of the slide runners 11 for the rails during repositioning operations on the pipes. The slide runners are very short, are easy to replace, and cost very little compared to the rails, which are made of heat-resistant steel.

(d) The field of vision through viewing windows that an observer standing on walkway 3 can have of the movable stops 18 when they are in action against the ends of the pipes 8 facilitates the initial adjustment of the positioning means and the monitoring of their operation.

What is claimed is:

1. An apparatus for handling elongate cylindrical pipes (8), comprising:
   (a) a furnace (1) including a horizontal bed (6) and opposite side walls (2),
   (b) a pair of spaced parallel rails (7) mounted on the bed between the side walls,
   (c) conveyor means (9, 10) for rolling pipes disposed laterally across the rails over the rails from an entry end of the furnace to an exit end thereof, and
   (d) at least one positioning device disposed between the entry and exit ends of the furnace for re-centering laterally displaced pipes, said device comprising two separate and independence stop members (18) disposed facing each other on opposite sides of the rails, and control means (16) for moving the stop members between a retracted position whereat they are withdrawn from a path of movement of the pipes and from the interior of the furnace, and an extended position whereat they project into the furnace and abut the ends of a displaced pipe rolling between them to transversely re-center the pipe, wherein
   (e) the stop members are individually mounted on upper ends of two symmetrically elbowed arms (14) disposed substantially outside of the furnace and whose other, lower ends are articulated about spaced axes (15) disposed parallel to the direction of conveyance of the pipes and below the bed and rails, said upper ends of the arms extending into the furnace through access ports (20) in the side walls thereof, and
   (f) the control means are articulated to the elbowed arms and similarly disposed below the bed and rails, whereby free and unobstructed access is provided along the side walls, outside of the furnace, at the level of pipe conveyance.

2. The apparatus of claim 1, further comprising means (19) for automatically returning the arms to positions whereat the stop members are retracted in response to a power failure disabling the control means.

3. The apparatus of claim 2, wherein the return means comprises counterweights mounted on the arms horizontally remote from the spaced axes.

4. The apparatus of claim 1, further comprising a pair of slide runners (11) individually mounted adjacent the rails and between the stop members, and having upper surfaces over which the pipes roll elevated slightly above upper surfaces of the rails, whereby any transverse re-centering movements of the pipes occur when the pipes are supported on the slide runners to thereby avoid the wear and abrasion of crowns of the rails.

5. The apparatus of claim 4, wherein each slide runner has sloping front entry and rear exit ramps (12).

6. The apparatus of claim 3, further comprising a pair of slide runners (11) individually mounted adjacent the rails and between the stop members, and having upper surfaces over which the pipes roll elevated slightly above upper surfaces of the rails, whereby any transverse re-centering movements of the pipes occur when the pipes are supported on the slide runners to thereby avoid the wear and abrasion of crowns of the rails.

7. The apparatus of claim 6, wherein each slide runner has sloping front entry and rear exit ramps (12).

8. An apparatus for handling elongate cylindrical pipes (8), comprising:
 (a) a furnace (1) including a horizontal bed (6) and opposite side walls (2),
 (b) a pair of spaced parallel rails (7) mounted on the bed between the side walls,
 (c) conveyor means (9, 10) for rolling pipes disposed laterally across the rails over the rails from an entry end of the furnace to an exit end thereof,
 (d) at least one positioning device for re-centering laterally displaced pipes, said device comprising two movable stop members (18) disposed facing each other on opposite sides of the rails, and control means (16) for moving the stop members between a retracted position whereat they are withdrawn from a path of movement of the pipes, and an extended position whereat they abut the ends of a displaced pipe rolling between them to transversally re-center the pipe, and
 (e) a pair of slide runners (11) individually mounted adjacent the rails and between the stop members, and having upper surfaces over which the pipes roll elevated slightly above upper surfaces of the rails, whereby any transverse re-centering movements of the pipes occur when the pipes are supported on the slide runners to thereby avoid the wear and abrasion of crowns of the rails.

9. The apparatus of claim 8, wherein each slide runner has sloping front entry and rear exit ramps (12).

* * * * *